United States Patent [19]

Roesink et al.

[11] Patent Number: 5,076,925
[45] Date of Patent: Dec. 31, 1991

[54] PROCESS FOR PREPARING A MICROPOROUS MEMBRANE AND SUCH A MEMBRANE

[75] Inventors: Hendrik D. W. Roesink, Hengelo; Dirk M. Koenhen, Dedemsvaart; Marcellinus H. V. Mulder, Enschede; Cornelis A. Smolders, Hengelo, all of Netherlands

[73] Assignee: X-Flow B.V., Enschede, Netherlands

[21] Appl. No.: 510,170

[22] Filed: Apr. 17, 1990

[30] Foreign Application Priority Data

Apr. 28, 1989 [NL] Netherlands ................. 8901090

[51] Int. Cl.$^5$ .................. B01D 33/21; C08J 9/00
[52] U.S. Cl. .................. 210/500.23; 210/500.27; 210/500.39; 521/50; 521/61
[58] Field of Search ............ 210/500.23, 500.21, 210/500.27, 653, 500.39, 482, 489, 900; 521/60, 905, 50, 51, 61

[56] References Cited

U.S. PATENT DOCUMENTS 3,957,651  5/1976  Kesting .................. 210/500.33
4,664,669  5/1987  Ohyabu et al. ............ 521/51
4,798,847  6/1989  Roesink et al. ........... 210/500.27

FOREIGN PATENT DOCUMENTS 0228072  7/1987  European Pat. Off. .
0261734  3/1988  European Pat. Off. .

OTHER PUBLICATIONS

Patent Abstracts of Japan, vol. 12, No. 398, Oct. 21, 1988, p. 83 C 538; & JP-A-63 141 610 (Fuji Photo Film Co., Ltd.), 14-06-88.
Database WPILm AN 88-202856, Derwent Publication, London, GB; & Chemical Abstracts, vol. 109, No. 18, Oct. 31, 1988, p. 75, Abstract nr 151087d, Sasaki Jun et al., "Preparation of Microporous Polysulphone Membranes" *Abstract*.
Patent Abstracts of Japan, vol. 12, No. 338, Sep. 12, 1988, p. 30 C 527, & JP-A-63 97 202 (Toray Ind. Inc.) 27-04-1988.
Database WPIL, Derwent Publ. London, GB, AN 88.157690 *Abstract*.
Patent Abstracts of Japan, vol. 11, No. 85, Mar. 14, 1987, p. 85 C 410, & JP-A-61 238 834 (Toray Ind. Inc.), 24 ∝ 10-1986 & Database WPIL, Derwent Publications, London, GB AN-86-322277 *Abstract*.

Primary Examiner—Robert A. Dawson
Assistant Examiner—Ana Fortuna
Attorney, Agent, or Firm—Brooks Haidt Haffner & Delahunty

[57] ABSTRACT

The invention relates to a process for preparing a microporous membrane, starting from a mixture of at least a hydrophobic polymer and a hydrophilic polymer, by dissolving these polymers first in a suitable solvent or mixture of solvents and subsequently by coagulating in a coagulation bath. According to the invention a more or less hydrophilic membrane is prepared by removing the membrane so obtained from the coagulation bath and subsequently by leaching at least a part of the hydrophilic polymer from the matrix, alternatively followed by hydrophobization. Said leaching of the hydrophilic polymer occurs by treatment of the membrane with an oxidizing/hydrolizing agent. The invention furthermore comprises microporous membranes, flat or tubular or in the form of hollow fibers, having a good chemical resistance and good mechanical strength.

16 Claims, No Drawings

PROCESS FOR PREPARING A MICROPOROUS MEMBRANE AND SUCH A MEMBRANE

This invention relates to a process for preparing a microporous membrane, starting from a hydrophobic polymer and a hydrophilic polymer, by dissolving these polymers first in a suitable solvent or a mixture of solvents and, subsequently by coagulating the dissolved polymers in a coagulation bath, as well as to such microporous membranes.

Such a process has been disclosed in Dutch Patent Application 8,602,402. The just-mentioned Dutch Patent Application describes a process for preparing hydrophilic porous membranes based on a mixture of at least two polymers, i.e., a hydrophobic polymer (preferably a polyetherimide) and a hydrophilic polymer (preferably polyvinylpyrrolidone). An essential aspect of the known process is based on the fact that the hydrophilic polymer, still present after coagulation, will be cross-linked in an unswollen state, in such a way that swelling will be limited to an acceptable minimum, while the thus obtained membranes can be used for filtration applications. The permeability of these membranes is in accordance with the pore size and the porosity which can be observed by means of e.g., an electron microscope. The above-mentioned cross-linking of the hydrophilic polymer preferably takes place by means of a suitable heat treatment, but the cross-linking can also be effected chemically.

It is noted that the cross-linking of the membranes is absolutely necessary, because otherwise the hydrophilic polymer present, preferably polyvinylpyrrolidone, swells too much, resulting in only very poor permeability values.

A special aspect of the invention described in Dutch Patent Application 8,602,402 is the fact that a considerable amount of hydrophilic polymer, especially polyvinylpyrrolidone, remains in or on the membrane matrix after coagulation in a water bath or generally in a bath comprising a solvent (but a non-solvent for the hydrophobic polymer) for the hydrophilic polymer. It also appeared that the hydrophilic polymer present in the polymer solution partly remains in the matrix and is thus also partly found in the coagulation bath. This and that can be demonstrated by a method, which has been especially developed for measuring the concentration of the hydrophilic polymer in the coagulation bath.

Besides the advantages described in the Dutch Patent Application 8,602,402, the known membranes have a number of disadvantages.

As an important disadvantage can be mentioned that cross-linking the remaining hydrophilic polymer may give rise to a relatively brittle membrane causing problems with the incorporation of the membranes in modules.

Further, the known membranes are always hydrophilic, which cannot always be considered an advantage.

Finally, the amount of hydrophilic polymer in the matrix is hard to control.

The present invention now aims at providing a process, which solves the above-mentioned disadvantages in an effective way.

To this end the present invention provides a process for preparing a microporous membrane, starting from a mixture of at least a hydrophobic polymer and a hydrophilic polymer, by dissolving these polymers first in a suitable solvent or mixture of solvents and, subsequently coagulating the dissolved polymers in a coagulation bath, characterized in that a more or less hydrophilic membrane is prepared by removing the membrane so obtained from the coagulation bath and thereafter by removing at least part of hydrophilic character of the polymer from the matrix, eventually followed by hydrophobisation.

Surprisingly, according to the present invention, it appeared to be possible to control the amount of hydrophilic polymer in the membrane matrix, in such a manner, that the amount of hydrophilic polymer in the membranes finally obtained can have a value of about 0-35% by weight, based on the total dry weight of polymer in the membranes.

According to the invention the hydrophilic polymer from the matrix can be removed partly or substantially, so that the hydrophilicity respectively &he hydrophobicity of the membrane can be regulated according to necessity. In case that about all of the hydrophilic polymer is removed, the present invention provides the interesting possibility, to prepare a very porous hydrophobic membrane matrix on the basis of a mixture of a hydrophilic and a hydrophobic polymer. It is noted that for obtaining a porous matrix it is necessary per se that use is made of a hydrophilic polymer with the followed membrane preparation procedure. That is the application of the hydrophilic polymer is essential for obtaining a porous membrane structure, in which the pores are interconnected in an optimal manner, so that the membranes can be applied for filtration purposes in a suitable way.

An important aspect of the present invention can be found in the fact that the desired porous structure in the membranes can only be obtained when the membranes are subjected to a suitable post-treatment.

It appeared that in a number of cases the complete or incomplete removal of the hydrophilic polymer can be accomplished in a water bath, which absorbs much time and has further the disadvantage that the hydrophobic polymer present, e.g. polyetherimide, is affected by hydrolysis.

According to the present invention the removal at least in part of the hydrophilic character of the polymer is realised by treatment of the membrane with an oxidising in the nature of chemically reacting hydrolysing agent. Examples of these are acidified potassium permanganate ($KMnO_4$), hydrogen peroxide, sodium peroxide etc. etc. Advantageously a sodium hypochlorite solution can be applied.

By applying a sodium hypochlorite solution leaching occurs considerably faster than in a water bath, whereby furthermore the remaining hydrophobic matrix is not at all or hardly affected.

Further, the treatment with sodium hypochlorite solution has the advantage, that the membranes so treated are very suitable as filtration membranes, because the swelling of the hydrophilic polymer still present is reduced in such a manner, that no clogging of the pores occurs. Owing to this the fluxes of the membranes so obtained are in accordance with the size of the pores and the porosity of the membranes, as can be observed by means of an electron microscope. It should be noted, that after the treatment of the membranes with sodium hypochlorite solution there is still sufficient hydrophilic polymer left behind to give the membrane a hydrophilic character which still allows wetting the membranes with water.

However this hydrophilicity or water wettability of the membranes according to the invention disappears when the membranes are subjected to treatment at elevated temperatures after the mentioned treatment with sodium hypochlorite solution. Therefore the membranes are heated to approximately 150° C. for 2-30 hours. The thus heat-treated membranes can be considered to be hydrophobic.

It is noted that, as hydrophobic polymer according to the invention preferably polyetherimide, polyethersulphone, polysulphone, polyimide, etc. and as hydrophilic polymer polyvinylpyrrolidone, polyacryl acid, polyvinyl-alcohol, polyvinylacetate, polyethylene glycol etc. etc. are used.

As a solvent for the polymer according to the invention one uses in general N-methylpyrrolidone, dimethylformamide, dimethylacetamide, dimethylsulphoxide, chloroform, methylenechloride etc. etc.. For the preparation of the microporous membranes according to the invention hydrophobic polymer / hydrophilic polymer / solvent ratios of 10-35% by weight / 15-35% by weight / 85-30% by weight are generally used, and preferably 25-20% by weight / 10-15% by weight / 75-65% by weight.

It is noted that according to the invention flat membranes, tubular ones, either on or off a support, as well as in the form of hollow fibers can be prepared.

Finally, the invention also relates to microfiltration and/or ultrafiltration membranes, flat or tubular or in the form of hollow fibers, consisting essentially of a hydrophobic polymer and more or less of a hydrophilic polymer, which hydrophilic polymer has been cross-linked and fixated in or at the polymer matrix, the membrane having pores of 0.0001-5 /um, a heat resistance up to 250° C., a water permeability up to 8000 1/m2.h.bar, also having a good chemical resistance and good mechanical strength.

It appeared that the membranes according to the invention are very suitable for membrane separations, based on particle sizes, e.g. ultra- and microfiltration. It is apparent that the present membranes are not to be restricted to the applications just cited. For example the hydrophobic embodiments of the present membranes can advantageously be used as aeration medium, oxygenerator, bioreactor etc.. For special applications it is also possible to provide the capillary membranes with a hydrophobic (e.g. the inner surface) as well as a hydrophilic surface (e.g. the outer surface).

The degree of hydrophilicity is especially of interest in connection with protein adsorption or in a general sense in connection with the so called fouling of membranes. Until today there is little agreement in the literature concerning a good relationship between the degree of hydrophilicity and the fouling properties of membranes, while the plurality of the knowledge in this field is based on experimental results. It appeared from research by Applicants that the adsorption of BSA (bovine serum albumine, a model protein, which is often used for fouling studies) on membrane surfaces depends on the post-treatment of the membranes. The amounts of adsorbed BSA to PEI/PVP membranes, which have been subjected to a heat treatment (see Example I), is approximately 2 mg/mz membrane surface and is comparable with the amounts for cellulose type membranes presented in the literature. This latter type of membrane is still considered to be the best example for non-fouling membranes. If the PEI/PVP membranes are subjected to a NaOCl treatment (see Example II) or a NaOCl treatment followed by a heat treatment (see Example III), then the amount of adsorbed BSA is approximately 8 mg/mz membrane surface. It is remarkable that hardly any difference can be detected in the amount of BSA adsorbed between the membrane of Example II (hydrophilic) and the membrane of Example III (hydrophobic), which gives a good illustration of the fact that the degree of hydrophilicity plays an important role in fouling. It should be noted that it is conceivable that, in contrast, the membrane of Example II shows good anti-fouling properties if other feed solutions are used.

It may be obvious that the leaching process with e.g. sodium hypochlorite solution affords the possibility to control the hydrophilic character of the membranes and to adjust it to the desired conditions.

The invention will now be illustrated with the following not limitative examples.

EXAMPLE I

A solution was prepared from 17 parts by weight polyetherimide (Ultem ® 1000), 13 parts by weight PVP in 70 parts by weight N-methyl-2-pyrrolidone. The thus obtained polymer solution was spun to a capillary membrane by coagulation in a water bath with a temperature of 20° C.-80° C.

After removal from the coagulation bath the membranes were dewatered by subsequent treatment with ethanol and hexane. After deswelling the membranes were subjected to heat treatment at 150° C. for 2-30 hours.

After this treatment the membranes still contained 20-25 parts by weight PVP based on the total membrane weight. The water flux of these membranes was 500°2700 1/m2.h.bar, while the water absorption capacity of the membrane material was only 5% by weight.

EXAMPLE II

Membranes according to Example I were spun and after removal from the coagulation bath the membranes were treated with a NaOCl solution of 40-4000 ppm for at least 24 hours. After this treatment the membranes were still hydrophilic (i.e. water wettable) and having a water flux of 50-4200 1/m2.h.bar. The membranes contained a maximum amount of PVP of 0-10% by weight. The water absorption capacity was less than 5% by weight

EXAMPLE III

A membrane prepared according to Example II was subjected to heat treatment at 150° C. for 2-30 hours, after the NaOCl treatment. After this treatment the membranes were no longer wettable by water (hydrophobic). The water flux (after moistening with e.g. ethanol) was 50-4200 1/m2.h.bar. The water absorption capacity of these membranes was less than 1% by weight.

EXAMPLE IV

A solution was prepared from 20 parts by weight polyethersulphone (Victrex ®), 10 parts by weight polyvinylpyrrolidone, 5 parts by weight isopropylalcohol in 65 parts by weight N-methylpyrrolidone. The thus obtained polymer solution was spun to a capillary membrane by coagulation in a water bath of 20°-80° C. After removal from the coagulation bath the membranes were dewatered by a subsequent treatment with ethanol and hexane. After deswelling the membranes were subjected to heat treatment at 150° C. for 2-30 hours.

After this treatment the membranes still contained 2-10 parts by weight PVP, based on the total membrane dry weight. The flux of the membranes was 500-5000 l/m2.h.bar, while the water absorption capacity of the membrane material was only 3% by weight.

EXAMPLE V

Membranes according to Example V were spun and after removal from the coagulation bath the membranes were treated with a sodium hypochlorite solution of 40-4000 ppm during at least 24 hours. After this treatment the membranes were still hydrophilic (capable of being moistened) and having a water flux of 500-7500 l/m2.h.bar. The membranes contained a maximum amount of PVP of 0-5% by weight. The water absorption capacity was less than 3% by weight.

We claim:

1. A process for preparing a microporous membrane comprising dissolving a hydrophobic polymer and a hydrophilic polymer in a suitable solvent or mixture of solvents to obtain a polymer solution, and subsequently coagulating the polymer solution in a coagulation bath to obtain a membrane, removing the membrane so obtained from the coagulation bath and subsequently chemically reacting said membrane to remove at least a part of the hydrophilic character of the polymer, alternatively followed by hydrophobisation.

2. A process for preparing a microporous membrane comprising dissolving a hydrophobic polymer and a hydrophilic polymer in a suitable solvent or mixture of solvents to obtain a polymer solution, and subsequently coagulating the polymer solution in a coagulation bath to obtain a membrane, removing the membrane so obtained from the coagulation bath and subsequently chemically reacting said membrane with an oxidising-/hydrolising agent to remove at least a part of the hydrophilic character of the polymer, alternatively followed by hydrophobisation.

3. A process according to claim 2 wherein a sodium hydrochlorite solution is used as the oxidising/hydrolising agent.

4. A process according to any of the claims 1-3 wherein the hydrophobisation occurs by subjecting the membrane, from which at least a part of the hydrophilic character has been removed, to heat treatment.

5. A process according to claim 4 wherein the heat treatment is effected at approximately 150° for 2-30 hours.

6. A process according to claim 2 wherein polyetherimide is used as a hydrophobic polymer and polyvinylpyrrolidone is used as a hydrophilic polymer.

7. A process according to claim 2 wherein N-methylpyrrolidone is used as a solvent for the polymers.

8. A process according to claim 2 wherein a flat or tubular membrane, on or off a support, or in the form of hollow fibers is prepared.

9. Microporous membranes which can be made hydrophobic by heat treatment, flat or tubular or in the form of a hollow fibers, essentially comprising at least a hydrophobic polymer and a hydrophilic polymer, which hydrophilic polymer has been cross-linked and has been fixated in or at the polymer matrix, the membrane having pores of 0.0001-5 /um, a heat resistance up to 250° C., a water permeability up to 8000 l/m2.h.bar, also having a good chemical resistance and good mechanical strength.

10. A process according to claim 6 wherein a sodium hypochlorite solution is used as the oxidising/hydrolising agent and the hydrophobisation occurs by subjecting the membrane, from which at least a part of the hydrophilic character has been removed, to heat treatment.

11. A process according to claim 7 wherein polyetherimide is used as a hydrophobic polymer and polyvinylpyrrolidone is used as a hydrophilic polymer.

12. A process according to claim 11 wherein a sodium hypochlorite solution is used as the oxidising/hydrolising agent and the hydrophobisation occurs by subjecting the membrane, from which at least a part of the hydrophilic character has been removed, to heat treatment.

13. A process according to claim 1 wherein the hydrophobic polymer is from 10-35% by weight, the hydrophilic polymer is from 15-35% by weight and the solvent is from 85-30% by weight of the weight of the polymer solution.

14. A process according to claim 13 wherein polyetherimide is used as a hydrophobic polymer and polyvinylpyrrolidone is used as a hydrophilic polymer.

15. A process according to claim 13 wherein N-methylpyrrolidone is used as a solvent for the polymers.

16. A process according to claim 13 wherein polyetherimide is used as a hydrophobic polymer and polyvinylpyrrolidone is used as a hydrophilic polymer, N-methylpyrrolidone is used as a solvent for the polymers, a sodium hypochlorite solution is used as the oxidising-/hydrolising agent and the hydrophobisation occurs by subjecting the membrane, from which at least a part of the hydrophilic character has been removed, to heat treatment.

* * * * *

UNITED STATES PATENT AND TRADEMARK OFFICE
CERTIFICATE OF CORRECTION

PATENT NO. : 5,076,925

DATED : December 31, 1991

INVENTOR(S) : HENDRIK D.W. ROESINK et al

It is certified that error appears in the above-identified patent and that said Letters Patent is hereby corrected as shown below:

Col. 2,.1. 18, change "he" to --the--.

Col. 2, 1. 46, strike "in the nature of chemically reacting" and insert --/-- before "hydrolysing".

Col. 3, 1. 63, change "mz" to --m2--.

Col. 3, 1. 68, change "NaOCI" to --NaOCl--. (both occurrences)

Col. 4, 1. 3, change "mz" to --m2--.

Col. 4, 1. 35, insert a hyphen (-) between "500" and "2700".

Col. 4, 1. 47, insert a period (.) after the word "weight".

Signed and Sealed this

Twenty-seventh Day of April, 1993

Attest:

MICHAEL K. KIRK

Attesting Officer

Acting Commissioner of Patents and Trademarks